Jan. 9, 1962  R. H. MULLER  3,016,231
ROTOR SEAL
Filed Aug. 9, 1954
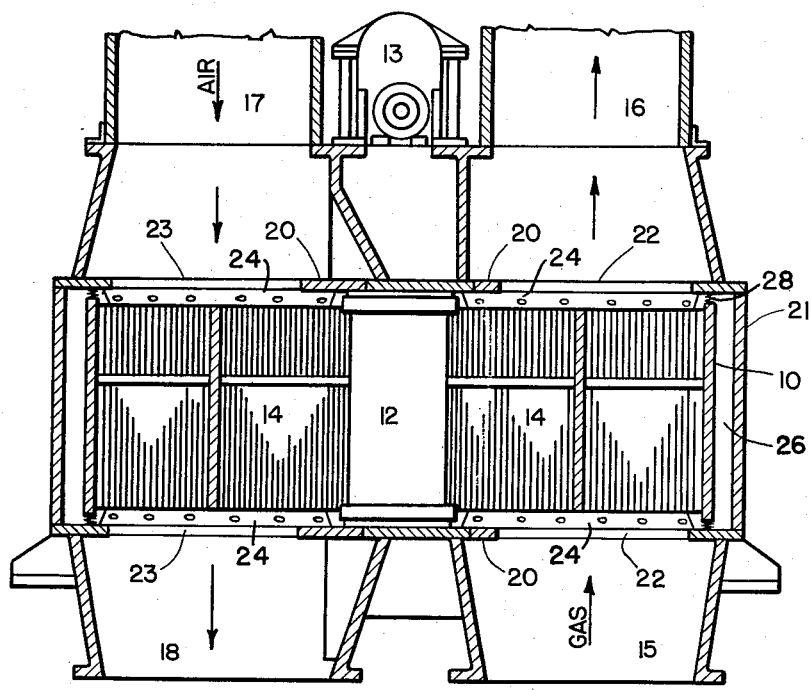
FIG. 1
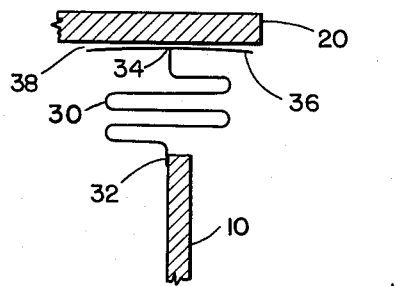
FIG. 2
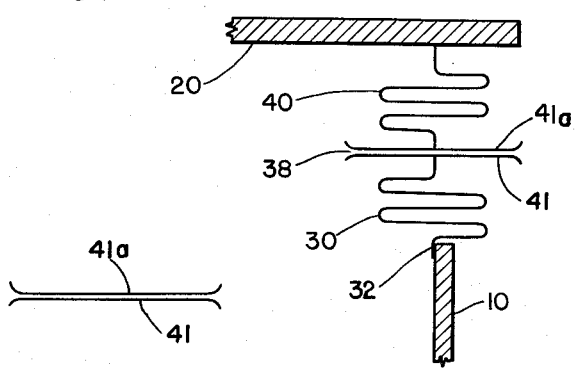
FIG. 5
FIG. 6
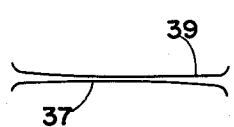
FIG. 3
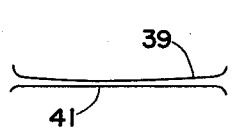
FIG. 4
INVENTOR
ROBERT H. MULLER
BY
ATTORNEY

United States Patent Office 3,016,231
Patented Jan. 9, 1962

3,016,231
ROTOR SEAL
Robert H. Muller, Wellsville, N.Y., assignor to The Air Preheater Corporation, New York, N.Y., a corporation of New York
Filed Aug. 9, 1954, Ser. No. 448,695
8 Claims. (Cl. 257—269)

The present invention relates to rotary regenerative air preheaters or like apparatus and particularly to improvements in sealing devices positioned to preclude fluid flow between a rotor and a rotor housing in which it is enclosed.

In a rotary regenerative air preheater a cylindrical rotor has compartments that carry metallic heat transfer elements, which as the rotor turns are first exposed to the heating gases and then disposed in an air passage to impart absorbed heat to the air passing therethrough. The rotor is surrounded by a housing having end or sector plates formed with openings to provide for the flow of gas and air and in order to prevent the mixing of the streams of gas and air the radial partitions that divide the rotor into compartments are provided on their ends with radial seals that contact confronting surfaces of the sector plates. To preclude flow of gas or air through the clearance space between the side of the rotor and housing in a way to bypass the heat transfer material it is customary to provide the rotor with circumferential seals that bear against the sector plates or other stationary parts of the air preheater structure.

Usually both radial and circumferential seals of the type defined are fixed to the end edges of the rotor so as to bear against a fixed portion of the rotor housing. To be effective, seals of this nature must be constantly biased into direct contact with their cooperating sealing surfaces, and as a result there occurs a rapid abrading of the rubbing members which necessitates frequent seal replacement, adjustment or repair. The rubbing of the sealing members also creates a substantial frictional resistance which normally requires the expenditure of considerable energy merely to overcome. Moreover, rubbing seals of the usual type permit some fluid leakage even when used with relatively low pressure fluids, while greater leakage is experienced when higher pressure fluids are encountered.

In the present invention, I therefore provide for an improved Venturi type sealing arrangement used in conjunction with a regenerative air preheater or the like which depends on fluid leakage between movable surfaces to effect its operation but which is self adjusting to close clearances between members so as to provide a relatively good sealing action with a minimum of frictional drag. A seal of this nature effectively handles relatively high pressures in the range of those frequently encountered in gas turbine application, the field in which this invention has specific significance.

The invention will be best understood upon consideration of the following detailed description when read in conjunction with the illustrative embodiments as presented in the accompanying drawings in which:

FIGURE 1 is a schematic view in sectional elevation of a rotary air preheater embodying the invention.

FIGURE 2 schematically illustrates a sectional view of a Venturi sealing device arranged according to the invention.

FIGURES 3, 4 and 5 illustrate cross sections of various sealing surfaces used in conjunction with a Venturi type sealing means.

FIGURE 6 illustrates still another form of Venturi type sealing means.

In the drawings the numeral 10 designates the cylindrical shell of a rotor having a rotor post 12 which is driven by a motor and reduction gearing 13 to turn the rotor slowly about its axis. The rotor is divided into sector shaped compartments that contain regenerative heat transfer material 14 in the form of closely spaced metallic plates which first absorb heat from hot gases entering the preheater through a duct 15 from a boiler or other source and are discharged through an outlet duct 16. As the rotor turns slowly about its axis, the heated plates 14 are moved into the stream of air admitted through a duct 17. After passing over the plates 14 and absorbing heat therefrom the stream of air is conveyed to the boiler furnace or other place of use through a duct 18. The end or sector plates 20 of the housing 21 enclosing the rotor 10 are apertured at 22 and 23 to admit and discharge streams of gas and air flowing through the preheater. In order that the streams of gas and air may not commingle, a portion of the rotor at least equal to but usually greater in circumferential extent than one rotor compartment must be isolated or blocked off between the gas and air passages. Radial seals 24 are provided in cooperative relation between the radial partitions of the rotor and the sector plates 20 whose imperforate portions must be at least slightly greater than the width of the compartments in the rotor. In order that the streams of gas and air may not by-pass the heat transfer surface 14 by flowing in the annular clearance space 26 between the rotor shell 10 and the housing 21 it is customary to provide the shell 10 with circumferential seals (indicated diagrammatically at 28 in FIGURE 1), which wipe against the sector plates 20 or allied parts so as to seal off the space 26 at both ends of the rotor 10.

In accordance with the present invention, the rotor shell and end plates of the housing are provided at the upper and lower ends of the rotor with sealing members extending axially therefrom and substantially bridging the spaces between the end edges of the rotor and the confronting end plates. Since the radial and circumferential sealing members are functional equivalents, the drawing depitcs only a cross sectional view of a typical sealing member which might be utilized as a circumferential or radial seal in a rotary regenerative air preheater or in any similar application where it is desired to substantially preclude flow through a fluid passageway.

In the construction illustrated in FIGURE 2, the sealing means comprises an axially extensible member here shown as a bellows type element 30 having an end edge 32 joined to the rotor shell 10 or to a radial diaphragm and an oppositely disposed edge 34 attached to a sealing shoe 36. The sealing shoe 36 is preferably convex or curved slightly transversely thereof so as to form, in cooperation with the end plate surface 20, a slightly convergent-divergent flow passageway 38 therebetween. FIGURE 6 illustrates an arrangement in which a second bellows element 40 is mounted on the end plate 20 in confronting relation to the rotor seal 30.

When the Venturi type seal is used as a circumferential seal between the rotor shell 10 and an end plate 20 the flow passageway 38 might also be achieved by shaping the cooperating portions of both the end plate 20 and the sealing shoe 36 in the manner illustrated and maintaining the lower sealing member substantially flat FIGURE 3, by shaping the upper sealing member only as illustrated in FIGURE 4, or even by using substantially flat sealing members for both upper and lower members as illustrated in FIGURES 5 and 6.

Usually the sealing element 30 is axially adjusted so that under normal conditions of equal pressure on both sides of the seal, the sealing member 30 is at rest, lightly abutting or slightly spaced from end plate 20. When a pressure differential is impressed across the seal, fluid is forced through the restricted passageway 38 formed between the sealing shoe 30 and the end plate 20 causing an increase in velocity of the fluid and a corresponding decrease in static pressure in the space between the sealing elements. Since either one or both of the cooperating sealing elements 30 and 20 are movably mounted, the static pressure differential between the fluid in the restricted passageway 38 and outside the passageway on the opposite side of member 36 will cause the element 30 to flex and permit the shoe 36 to approach its cooperating sealing member thereby tending to close the passageway. If however, the passageway should completely close, all flow therethrough would cease and the static pressure existing between the sealing members would rise to the value of that on either side of the seal thereby permitting the sealing member to return to a neutral position. By using various shapes or sizes of sealing members, or by varying the spring constant of the flexible mounting member 30, the sealing mechanism can be arranged to automatically set itself at any predetermined clearance.

If the sealing assembly is relatively small, or if there appears little opportunity of its being subjected to variations in temperature which might result in substantial thermal distortion, both sealing surface members 36 and 20 might be made from fairly rigid stock. For a large diameter seal or for a seal that is subject to substantial distortion it would be preferable to form the cooperating sealing members from non-rigid stock or from a plurality of arcuate shoes in end to end abutment, so that circumferentially displaced portions of each sealing member might automatically adjust themselves with only minor influence upon any remote portion of the seal.

To provide even greater flexibility to the sealing means when used in particular as a circumferential seal, an upper sealing shoe 41 may be connected to the end plate 20 through an additional extensible sealing element 40 as shown in FIGURE 6. By such an arrangement the cooperating sealing members 41a and 41 would each be free to move into or out of sealing relationship and the entire sealing assembly would more rapidly respond to variations of fluid flow or any warping and twisting of the rotor and its cooperating housing members.

The physical principle which make a sealing device of the type herein disclosed possible concerns the decrease in static pressure within a body of fluid as its velocity of flow increases. It is apparent therefore that a maximum closing force is produced upon the sealing members when fluid is flowing through the space between the sealing members at a high velocity, a condition which obtains when the members are closely adjacent but not in contacting engagement with one another. It therefore follows that the closing force is directly proportional to the pressure differential impressed across the seal, so that within normal operating limits, the greatest closing force is applied to the sealing member when the fluid pressures being handled are at their highest value.

If the rotor or rotor housing should warp or become thermally distorted in any manner so as to move the sealing members together and preclude fluid flow through the passageway 38, the static pressure within the passageway would rise to equalize the static pressure outside the passageway and the sealing members would return to a slightly open position thereby again permitting a slight amount of fluid flow therethrough. With the reoccurence of fluid flow through passageway 38, the pressure of the fluid would be reduced inversely proporitonal to the rate of fluid flow and the pressure differential across the movable sealing member would again tend to move it to a position of equilibrium closely adjacent to but not in contact with its cooperating sealing member.

While I have illustrated an axially extensible sealing element it should be obvious to those skilled in the art that a radially movable sealing element which responds to a pressure differential brought about by a Venturi type flow passageway with all its changes and modifications as required could be utilized without departing from the spirit of the invention.

What I claim is:

1. In a regenerative heat exchange device or the like having a rotor including a rotor shell and a housing enclosing the rotor and having axially spaced end plates formed with apertures for the flow of fluid therethrough, sealing means provided to substantially preclude the flow of fluid through the space between the rotor and the housing, said sealing means comprising; a first sealing surface mounted on the housing; a second sealing surface mounted on the rotor and forming in cooperation with said first sealing surface a restricted fluid passageway therebetween; and an extensible mounting means movably supporting one of said sealing surfaces for movement in an axial direction, said movably supported sealing surface having an area of sufficient size to provide a surface across which a differential of pressure effected by the flow of fluid through the restricted passageway is effective to move said surface relative to its cooperating sealing surface.

2. A sealing means as defined in claim 1 wherein one of said sealing surfaces is curved to provide a wall for a convergent-divergent fluid passageway.

3. A sealing means as defined in claim 1 wherein the cooperating sealing surfaces are substantially planar to provide an intermediate passageway having substantially parallel walls.

4. A sealing mechanism for apparatus having a rotor including a cylindrical rotor shell surrounded by a housing and provided opposite the rotor with end plates formed with apertures for the flow of fluids therethrough; said sealing mechanism comprising an axially extensible member positioned along an end edge of the rotor; a sealing shoe mounted on the extensible member and arranged to be normally at rest in closely spaced relation with a sealing surface on the housing to form a restricted passageway therebetween, the flow of fluids through said passageway effecting an area of low pressure therein whereby the differential of fluid pressure across the sealing shoe tends to move said sealing shoe toward its cooperating sealing surface.

5. A regenerative heat exchange device having a rotor including a cylindrical rotor shell and a housing surrounding the rotor and having end plates formed with apertures for the flow of fluids therethrough; sealing means provided between the end plates and the spaced end portions of the rotor; said sealing means comprising an axially flexible element mounted on an end edge of the rotor and having a free edge lying in the space between the rotor and end plate; and a sealing shoe mounted on the free edge of said coupling member forming in cooperation with said end plate a flow passageway therebetween, whereby the flow of fluids through said passageway lowers the static pressure therein and provides a differential of pressure across the sealing shoe sufficient to effect a partial closure of the passageway.

6. A regenerative heat exchange device having a rotor including a cylindrical rotor shell and a housing enclosing the rotor and having axially spaced end plates formed with apertures for the flow of fluid therethrough; sealing means provided between the end plates and spaced end portions of the rotor said sealing means comprising a first sealing shoe mounted on an end edge of the rotor and extending axially thereof into the space between the rotor and spaced end plate; an axially extensible element mounted on an end plate and having a free edge extending into the space between the first named sealing shoe and end plate; an axially movable sealing shoe movable with the free edge of said element to normally form a restricted fluid passageway in cooperation with a face of said first named sealing shoe, whereby the flow of fluids through said passageway lowers the static pressure therein and provides a pressure differential across the axially movable sealing shoe sufficient to effect a partial closing of the passageway.

7. A sealing means as defined in claim 6 wherein the first sealing shoe is spaced from the end edge of the rotor by an axially extensible mounting element.

8. In a regenerative heat exchange device having a rotor including a cylindrical rotor shell and a housing surrounding the rotor and having end plates formed with apertures for the flow of fluids therethrough; sealing means provided between the end plates and the spaced portions of the rotor, said sealing means comprising an axially extensible element mounted on an end edge of the rotor with a free edge of said element extending into the space between the rotor and end plate; and a convex sealing member mounted on said axially extensible element in spaced relation with said end plate adapted to provide a convergent-divergent passageway between the end plate and the sealing shoe whereby the flow of fluids through said passageway lowers the static pressure therein to provide a pressure differenial across the sealing shoe sufficient to extend said extensible element and thereby effect a partial closure of said passageway.

References Cited in the file of this patent

UNITED STATES PATENTS

| | | |
|---|---|---|
| 2,517,512 | Tigges et al. | Aug. 1, 1950 |
| 2,766,970 | Horn | Oct. 16, 1956 |